US008970962B2

(12) United States Patent
Filipovich et al.

(10) Patent No.: US 8,970,962 B2
(45) Date of Patent: Mar. 3, 2015

(54) VISOR HEADS-UP DISPLAY

(75) Inventors: Danny Filipovich, Lincolnwood, IL (US); Jack Fiore, Inverness, IL (US); Eric Ford, Shadow Hills, CA (US); Asaf Ashkenazi, Zinchron Yaakov (IL)

(73) Assignee: Elbit Systems Ltd, Haifa (IL)

( * ) Notice: Subject to any disclaimer, the term of this patent is extended or adjusted under 35 U.S.C. 154(b) by 120 days.

(21) Appl. No.: 12/862,987

(22) Filed: Aug. 25, 2010

(65) Prior Publication Data

US 2010/0315720 A1 Dec. 16, 2010

Related U.S. Application Data

(63) Continuation of application No. 12/404,087, filed on Mar. 13, 2009, now Pat. No. 7,791,809.

(60) Provisional application No. 61/036,281, filed on Mar. 13, 2008.

(51) Int. Cl.
*G02B 27/14* (2006.01)
*G02B 27/01* (2006.01)

(52) U.S. Cl.
CPC .... *G02B 27/0172* (2013.01); *G02B 2027/0132* (2013.01)
USPC .......................................................... 359/631

(58) Field of Classification Search
USPC ................................. 359/630, 631, 632, 633
See application file for complete search history.

(56) References Cited

U.S. PATENT DOCUMENTS

| 4,000,419 A | 12/1976 | Crost et al. |
| 4,266,848 A | 5/1981 | Schlegel |
| 4,468,101 A | 8/1984 | Ellis |
| 4,653,879 A | 3/1987 | Filipovich |
| 4,689,834 A | 9/1987 | McCarthy et al. |
| 4,775,217 A | 10/1988 | Ellis |
| 4,915,487 A | 4/1990 | Riddell, III et al. |
| 5,079,416 A | 1/1992 | Filipovich |
| 5,229,598 A | 7/1993 | Filipovich |
| 5,341,242 A | 8/1994 | Gilboa et al. |

(Continued)

FOREIGN PATENT DOCUMENTS

| CN | 1894617 | 1/2007 |
| CN | 1957284 | 5/2007 |

(Continued)

OTHER PUBLICATIONS

Chinese Office Action Appl No. 201080021291.2, mailed Jun. 29, 2013.

(Continued)

*Primary Examiner* — James Greece

(57) ABSTRACT

A wearable system is shown that presents one or more heads-up displays to the wearer. A data source provides information to an image generator that is sufficient to generate one or more display images, which are still or moving, characters or graphical displays. The output image from the image generator passes through a lens, reflects off a curved mirror, and passes back through the lens the other way. The image then passes through two lenses, between which an intermediate image exists. The image reflects off the "lens," or visor, of the glasses and proceeds to the pupil of the wearer's eye. Alternative embodiments use a helmet visor, mirror, or other (at least partially) reflective surface for the final reflection.

66 Claims, 5 Drawing Sheets

(56) References Cited

U.S. PATENT DOCUMENTS

| | | | |
|---|---|---|---|
| 5,416,876 A * | 5/1995 | Ansley et al. | 385/116 |
| 5,506,728 A | 4/1996 | Edwards et al. | |
| 5,654,828 A * | 8/1997 | Togino et al. | 359/633 |
| 5,712,726 A | 1/1998 | Espie et al. | |
| 5,978,144 A | 11/1999 | Li et al. | |
| 6,043,882 A | 3/2000 | De Wolf et al. | |
| 6,137,636 A | 10/2000 | Smith | |
| 6,198,090 B1 | 3/2001 | Iosue | |
| 6,201,641 B1 | 3/2001 | Filipovich | |
| 6,282,849 B1 | 9/2001 | Tuczek | |
| 6,342,872 B1 | 1/2002 | Potin et al. | |
| 6,560,029 B1 | 5/2003 | Dobbie et al. | |
| 6,747,802 B2 | 6/2004 | Bignolles et al. | |
| 6,765,729 B2 | 7/2004 | Perrin et al. | |
| 2004/0156114 A1 | 8/2004 | Sayed et al. | |

FOREIGN PATENT DOCUMENTS

| | | |
|---|---|---|
| CN | 1967309 A | 5/2007 |
| DE | 19724141 A1 | 12/1998 |
| GB | 2361573 | 10/2001 |
| JP | 2001-117045 | 4/2001 |
| JP | 2002107655 | 4/2002 |
| JP | 2003-43409 | 2/2003 |
| KR | 20040050008 A | 6/2004 |
| WO | 9745760 A1 | 12/1997 |
| WO | 2005062105 | 7/2005 |

OTHER PUBLICATIONS

Japanese Office Action, Application No. 2011-554243, mailed Jan. 7, 2014.

* cited by examiner

VISOR HEADS-UP DISPLAY

REFERENCE TO RELATED APPLICATIONS

This application is a continuation of and claims priority to U.S. application Ser. No. 12/404,087, titled "Visor Heads-Up Display" and filed Mar. 13, 2009, pending, which claims priority to U.S. Provisional Application No. 61/036,281, titled "Visor Heads-Up Display" and filed Mar. 13, 2008. This application claims priority to both of those prior applications, and incorporates herein the disclosures thereof by reference. This application is also related to U.S. Pat. No. 7,755,831, titled "Night Vision Glasses," and issued Jul. 13, 2010, and to U.S. application Ser. No. 12/834,325, titled "Night Vision Glasses," and filed Jul. 12, 2010.

FIELD

Some embodiments disclosed herein relate to optical systems and elements, and in particular to an optical system having a heads-up display.

DESCRIPTION

For the purpose of promoting an understanding of the principles of the invention, reference will now be made to certain embodiments illustrated in the disclosure, and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Heads-up displays (HUDs) designed for military use often fail to provide qualities desirable or essential for civilian use. For example, the bulk, weight, and expense associated with many military HUDs prevent those designs from penetrating civilian and especially entertainment markets.

The present invention enables HUD systems to be designed that are smaller and lighter than many previous military designs. Various embodiments fit normal-sized glasses, provide enhanced images, produce a field-of-view up to 35° (diagonal), and interface with many portable electronic devices.

Figure 1:
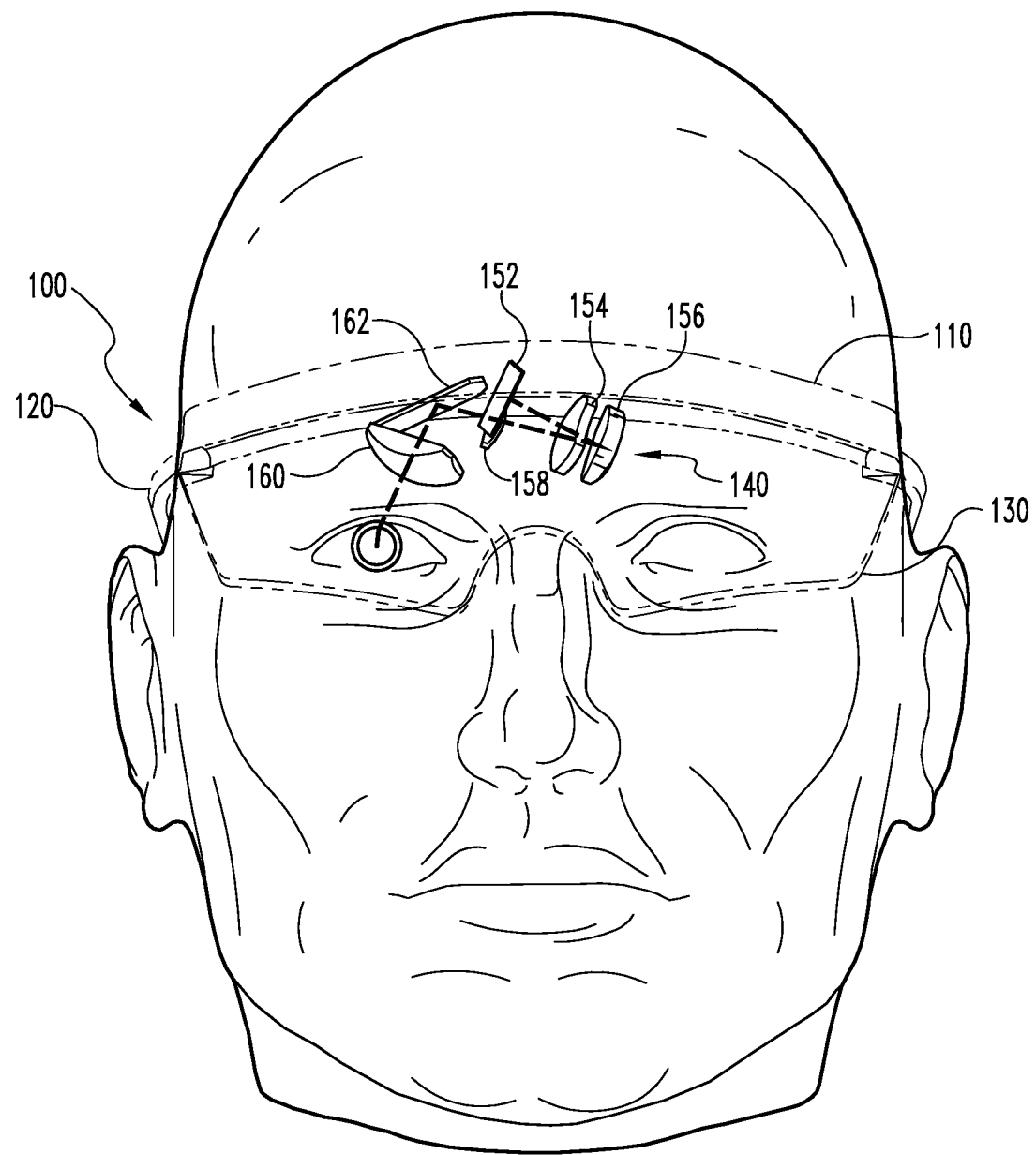
FIG. 1 is a front view of monocular head-up display (HUD) glasses according to one embodiment.
Figure 2:
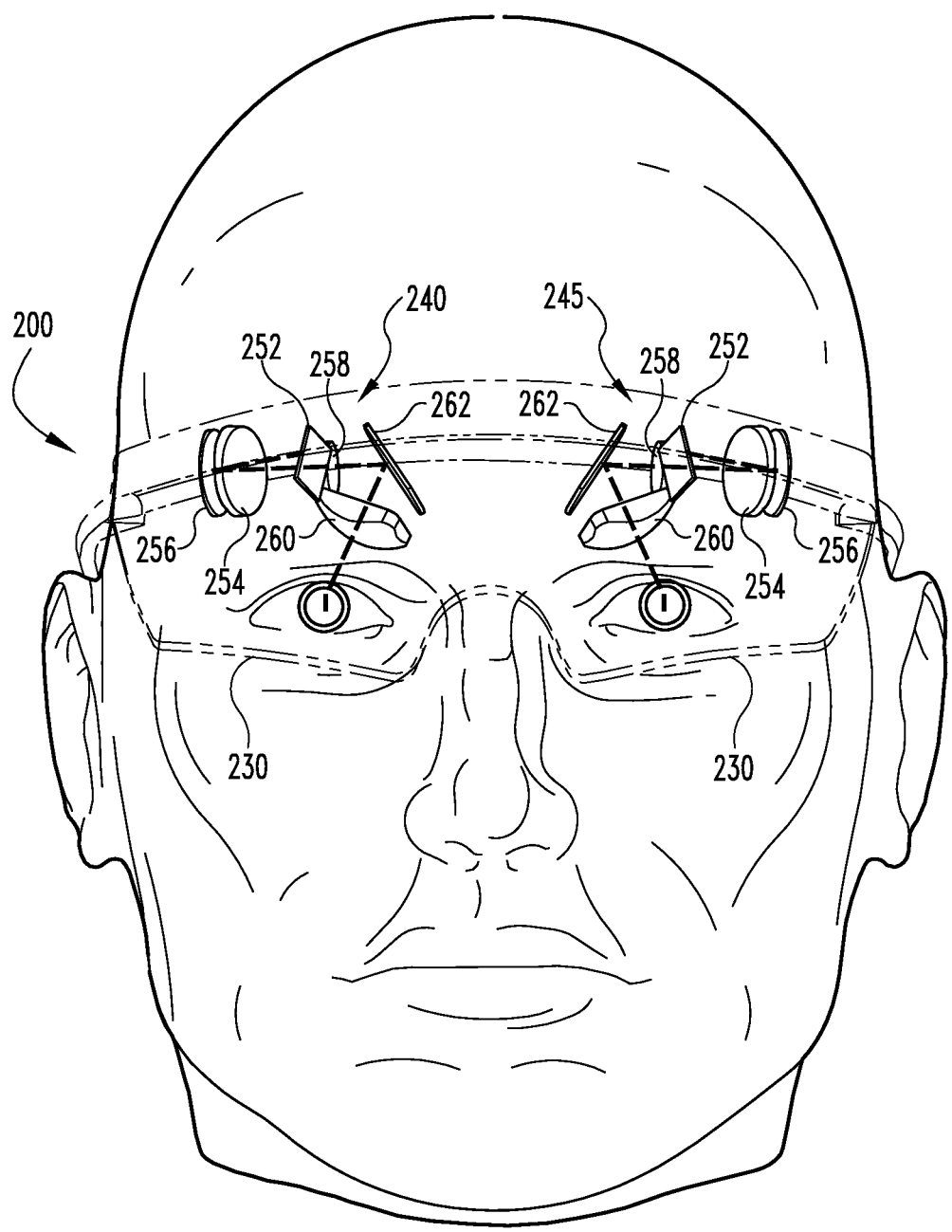
FIG. 2 is a front view of binocular HUD glasses according to a second embodiment.

Generally, a visor heads-up display according to some embodiments disclosed herein is illustrated in FIG. 1, while another is shown in FIG. 2. These visor embodiments are in the form of wrap-around glasses, though helmet-based forms, mirror-based forms, and other forms will occur to those skilled in the art in light of the present disclosure. For clarity, the word "visor" will be used to refer to the object that is within the view of the wearer, and off which the generated image(s) reflect(s), though that object might just as well be a lens, mirror, or other (at least partially reflective) object, whether or not the word "visor" would typically be used to describe it.

Turning to FIG. 1, monocular HUD glasses 100 include frame 110, stems 120, and a visor 130 as are customary or desirable. Optical system 140 generates a display image visible to one eye of the wearer on the surface of the visor 130. In various embodiments this display image includes data and/or images relevant to the user or his or her activities. In some embodiments, the display image relates to a game, e-mail or movie images, while in others it reflects physiological data (such as heart rate, blood pressure, or other data) to the wearer, driving and navigation data, or other information as will occur to those skilled in the art.

A second embodiment as shown in FIG. 2 is binocular HUD glasses that include a pair of optical systems 240 and 245, each one providing an image to one of the user's eyes. In addition to the displays discussed above in relation to FIG. 1, in various embodiments, these optical systems display data, images, stereoscopic images, and/or 3-D images as will occur to those skilled in the art.

Figure 3:
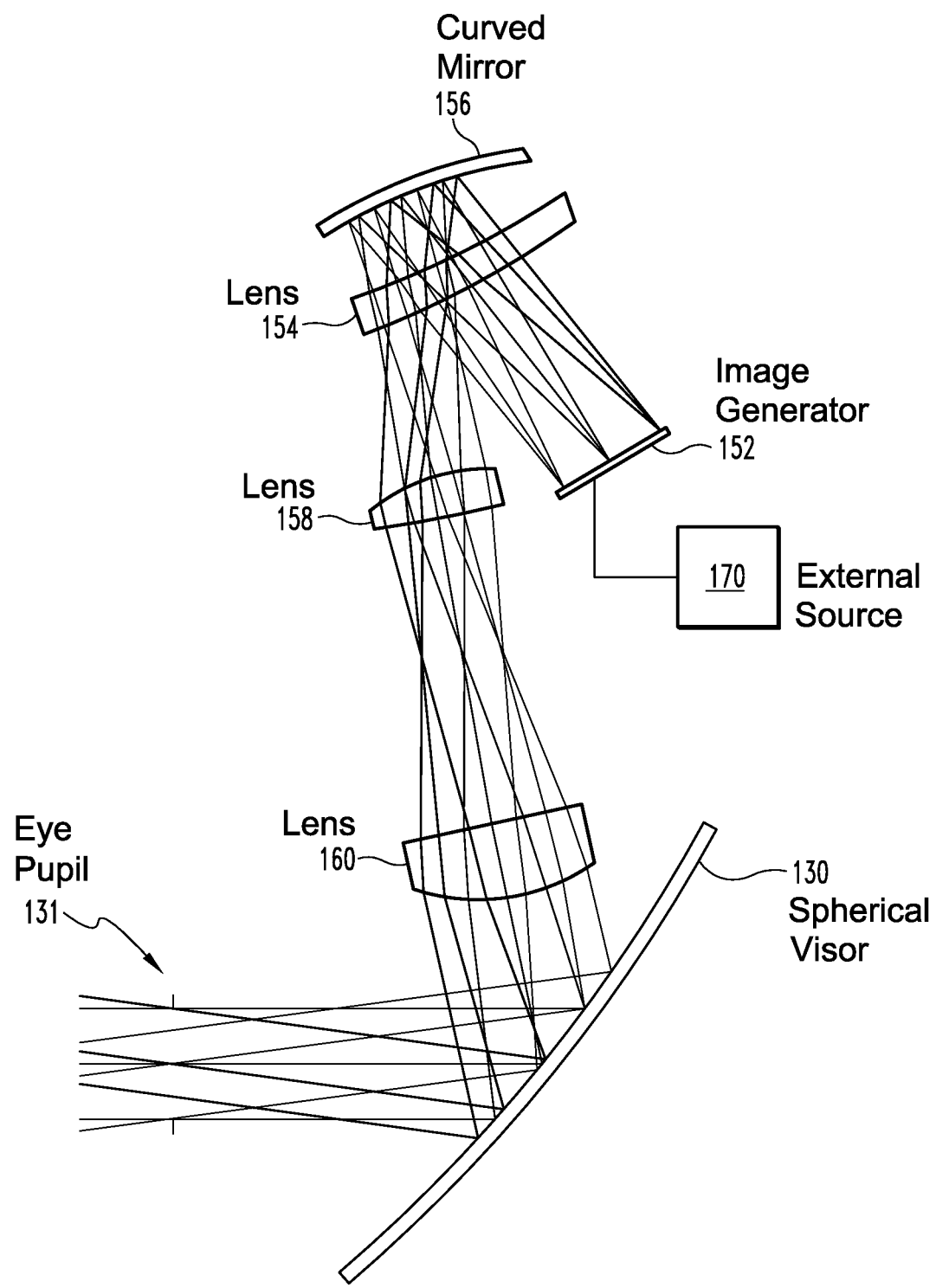
FIG. 3 is a schematic view of the optical path through the optical system in the embodiment of FIG. 1, unfolded at the planar fold minor for clarity.
Figure 4:
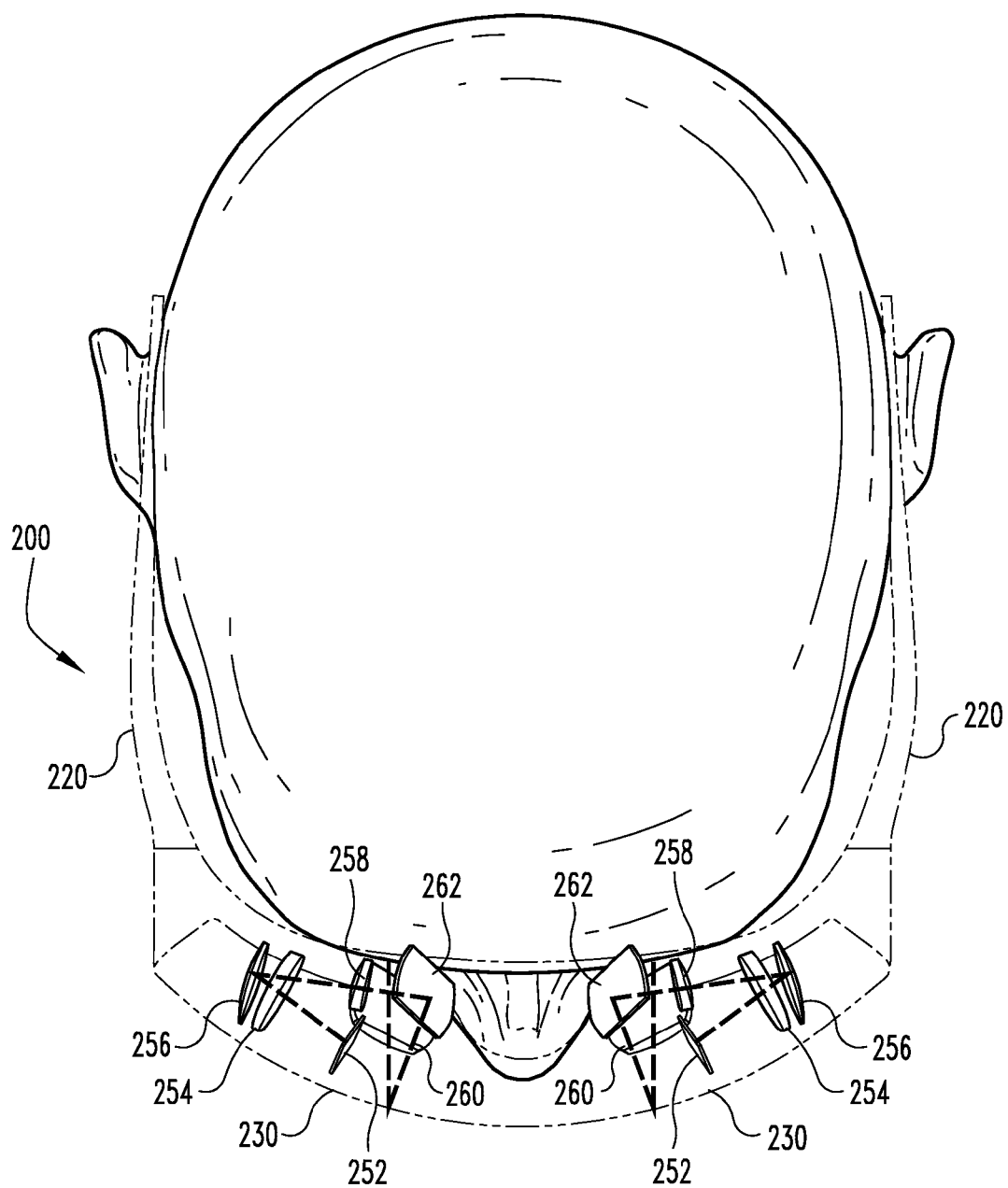
FIG. 4 is a top view of the embodiment of FIG. 2.

FIG. 3 provides a schematic view of the optical path for one of optical systems 140, 240, or 245 shown in FIGS. 1 and 2, which function in a substantially similar manner. For clarity, the fold produced by planar minor 162 has been removed from the optical path in this view. In this illustrated embodiment, a data source 170 provides information to image generator 152 with which to generate an image for the heads-up display. The image generator 152 can be an OLED or LCD-type display, though other display generators and technologies can be used in this system as will occur to those skilled in the art.

The display produced by the image generator 152 passes through lens 154, a thin, plastic, meniscus-type "corrector" lens, both before and after it is reflected off a curved (e.g., spherical, aspheric, hyperbolic, elliptical, parabolic, or toroid) mirror 156. In one embodiment, this combination of the spherical mirror 156 and cylindrical lens 154 corrects for the astigmatism and distortion that is caused by the spherical visor reflector 130. The mirror 156 in this embodiment is preferably a spherical front surface minor, but can also be a rear surface mirror so as to act as a Mangin minor. It can be made of any suitable material, even plastic. Lens 158 is matched with lens 160 and lens 154 to place and collimate the image at the pupil 301 of the user's eye. Lenses 160, 158, and 154 are plastic meniscus lenses in this embodiment, and an intermediate image appears between lens 160 and lens 158. The various lenses and minors of the system can be made of glass, plastic, or any other suitable material. Employing a combination of different plastics for the various lenses and minors provides good achromatization of the system, reducing the need for bulkier, heavier glass-type achromats.

Finally, the image reflects off the visor 130 of the HUD glasses and to the pupil 301 of the observer. The visor 130 in this embodiment is spherical, though in other embodiments it can be aspheric, parabolic, or toroidal in shape, or still another shape as will occur to those skilled in the art. Further, the visor 130 in this embodiment normally has uniform reflectivity, partial reflectivity, or reflectivity that varies vertically as in the lenses of some conventional sunglasses. The design with a spherical visor is more flexible and less sensitive to minor variations in manufacturing than some other designs.

In this embodiment, image generator 152 is preferably OLED type SVGA Microdisplay from eMagin. Other embodiments might use LCD type SVGA Display from Kopin or a similar source. Either of these displays can be used in monochrome or full-color modes. However, the OLED type display is preferred in this exemplary embodiment because of higher brightness and lower power consumption.

Lenses 154 and 160 are preferably made of a light plastic material, such as acrylic or polycarbonate, though other lens materials can be used as will occur to those skilled in the art. Likewise, minor 156 may be spherical, aspheric, parabolic, toroidal, or another shape to form a suitable combination with lens 154 and the rest of the system. In various embodiments, minor 156 is made of plastic, glass, metal, or other materials as will appear to those skilled in the art. Mirrors 156 and 162 may even be made using a replication process.

Lens 158 is preferably a polystyrene or polycarbonate type of plastic. Some of these plastic materials are made/distributed by companies such as General Electric. Other lenses may be used in other embodiments, as will occur to those skilled in the art.

Visor 130 is also preferably plastic and in various embodiments is tinted, untinted, treated with variable and/or light-sensitive dynamic tinting, or coated with a thin film reflection coating on one side. This thin film could be applied to a whole side, or to just a patch. The visor 130 is preferably made of polycarbonate plastic or another shatterproof material for improved eye safety, and is attached to the frame 110 using any of a variety of means that will occur to those skilled in the art.

The glasses shown in FIG. 2 include a pair of optical systems 240, 245 that each provide a heads-up display image to one of the user's eyes. Each optical system includes an image generator 252, lens 254, minor 256, lens 258, mirror 262, and lens 260, and again reflects the generated HUD image off visor 230.

To review, the embodiment shown in FIG. 1 is a HUD optical system 140 that uses a lens 154 that is aligned with the optical path, and through which the display image passes twice (once before reflection off a curved mirror 156, and once after reflection). Further, the disclosure herein shows a HUD display system that uses two non-doublet lenses 158 and 160, in combination with lens 154, wherein an intermediate image in the system is generated between lenses 158 and 160.

Figure 5:
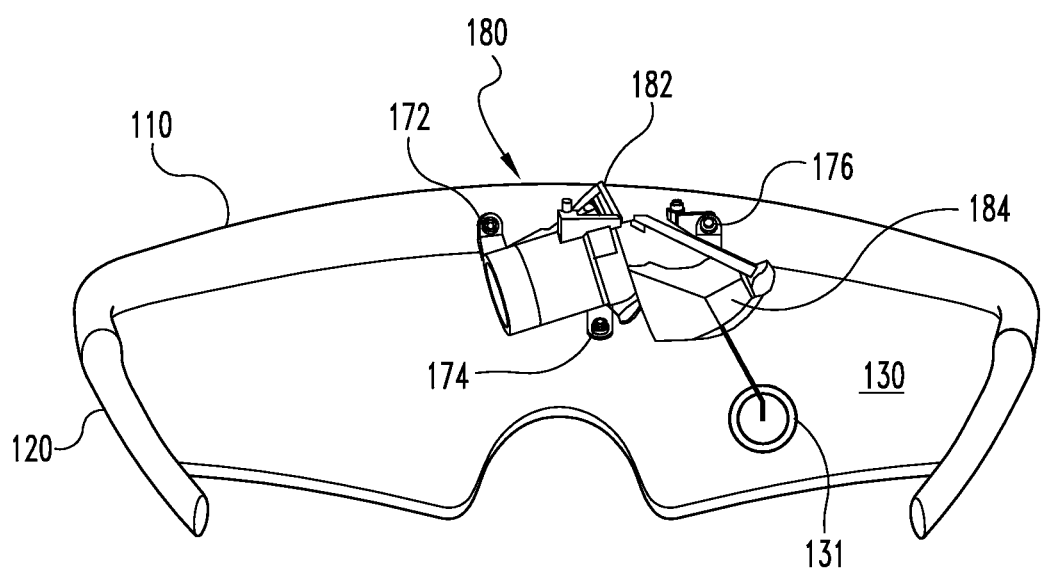
FIG. 5 shows a rear view of monocular HUD glasses with optical lenses and mirrors enclosed in mechanical housings according to the embodiment of FIG. 1.

Turning to FIG. 5, this embodiment shows optical assembly 180 attached to frame 110 with attachment features 172, 174, and 176. In various other embodiments, these features may vary in number and location, and use screws, welded joints, molded post attachments, and other methods of attachment that will occur to those skilled in the art to support optical assembly 180 in a particular relative position to visor 130 of glasses 100. As shown in FIG. 5, the optical assembly 180 is comprised of a plastic housing, all lenses and mirrors, and an image generator 152. Generator portion 182 of optical assembly 180 in this embodiment includes image generator 152 (which generates its output toward the left in this view), lens 154, and mirror 156, as discussed elsewhere herein. Output portion 184 of optical assembly 180 includes lenses 158 and 160, and folding mirror 162. The output image from output portion 184 reflects off a visor 130 to a pupil 131 of a user.

The data used to create the dynamic display of information, images, and/or video that appears on the displays in various embodiments is dynamically supplied to the first image generator by data source 170 in various ways in different embodiments, as will occur to those skilled in the art. For example, data may be displayed in character form, showing the user symbology, graphics or video images, or any combination thereof. This data may be provided to image generator 152 by external devices such as sensors (for example, GPS or biometric, etc.) or smartphones (for example, images or media). Similarly, still and moving graphics can be produced by video games, portable media players, and the like, and communicated to image generator 152 via wired and/or wireless data transfer techniques (including, for example, Wi-Fi, Bluetooth, Wi-Max, and the like) as will occur to those skilled in the art.

While the inventions have been illustrated and described in detail in the drawings and foregoing description, the same is to be considered as illustrative and not restrictive in character, it being understood that the preferred embodiment has been shown and described and that changes and modifications that come within the spirit of the invention are desired to be protected.

What is claimed is:

1. A heads-up display system for viewing images when the system is worn by a user, the system comprising:
   a first image generator that generates a first two-dimensional output image;
   a first mirror;
   a first visor having a reflective surface; and
   a first lens and a second lens,
   wherein during use the first image generator, first mirror, first lens, second lens, and first visor are fixed in relative positions so that when the system is worn by a user the first output image reflects off the first mirror, passes through the first lens and second lens, reflects off the reflective surface of the first visor into a first eye of the user, and an intermediate image appears between the first lens and the second lens.

2. The system of claim 1, wherein the first mirror is selected from the mirror type class consisting of:
   a toroidal mirror,
   an aspheric mirror,
   a hyperbolic mirror,
   an elliptical mirror,
   a parabolic mirror, and
   a spherical mirror.

3. The system of claim 1, wherein the first visor is a lens of a pair of glasses.

4. The system of claim 1:
   further comprising a first flat folding mirror; and
   wherein the first flat folding mirror reflects the first output image between the first and second lenses.

5. The system of claim 1, further comprising:
   a second image generator that generates a second two-dimensional output image;
   a third lens and a fourth lens;
   a second mirror; and
   a second visor having a second visor reflective surface;
   wherein during use the second image generator, third lens, fourth lens, second mirror, and second visor are fixed in relative positions so that the second output image reflects off the second mirror, passes through the third lens, passes through the fourth lens, reflects off the reflective surface of the second visor into a second eye of the user; and
   wherein an intermediate image appears between the third lens and the fourth lens.

6. The system of claim 5, wherein the first visor is a lens of a pair of glasses, and the second visor is a lens of the pair of glasses.

7. The system of claim 6, wherein the first visor and the second visor are the same lens of the pair of glasses.

8. The system of claim 1, wherein the reflective surface of the first visor is spherical, the first mirror is spherical, at least one optical surface of the first lens is cylindrical and the first mirror and first lens correct for astigmatism and distortion caused by the spherical reflective surface.

9. The system of claim 5:
    further comprising a fifth lens and a sixth lens;
    wherein during use the fifth lens is fixed in a position relative to the first mirror so that the first output image passes through the fifth lens both before and after the first output image reflects off the first mirror; and
    wherein during use the sixth lens is fixed in a position relative to the second mirror so that the second output image passes through the sixth lens both before and after the second output image reflects off the second mirror.

10. The system of claim 5, further comprising a frame that retains the first image generator, second image generator, first mirror, second mirror, first lens, second lens, third lens, and fourth lens in their respective positions relative to the first and second visors.

11. The system of claim 1, further comprising a data source that dynamically supplies the first image generator with information sufficient to generate a dynamic display of data to the user.

12. The system of claim 11, wherein the data source is a portable media player.

13. The system of claim 1, further comprising a frame that retains the first image generator, first mirror, first lens, and second lens in their respective positions relative to the first visor.

14. The system of claim 1, wherein the first mirror is curved and the first visor is curved.

15. A heads-up display system for viewing images when the system is worn by a user, the system comprising:
    a first image generator that generates a first two-dimensional output image;
    a first mirror;
    a first lens;
    a first visor having a reflective surface; and
    wherein during use the first image generator, first mirror, first lens, and first visor are fixed in relative positions so that the first output image passes through the first lens, reflects off the first mirror, passes through the first lens again, finally reflects off the reflective surface of the first visor into a first eye of the user.

16. The system of claim 15, wherein the first mirror is a non-flat mirror.

17. The system of claim 15, wherein the reflective surface is curved.

18. The system of claim 15, further comprising a frame that during use retains the first image generator, the first mirror, and the first lens, and the first visor in their relative positions.

19. The system of claim 15, wherein at least one optical surface of the first lens is cylindrical.

20. The system of claim 15, wherein the first lens is a meniscus lens.

21. The system of claim 15, wherein the first visor is a lens of a pair of glasses.

22. The system of claim 15, further comprising a first fold mirror.

23. The system of claim 15, further comprising:
    a second lens; and
    a third lens;
    wherein during use the first image generator produces a first output image and the first image generator, first mirror, first lens, second lens, third lens, and first visor are fixed in relative positions along a first optical path so that the first output image passes through the first lens, reflects off the first mirror, passes through the first lens again, passes through the second lens and the third lens, and finally reflects off the reflective surface of the first visor into a first eye of the user; and
    wherein an intermediate image appears between the second lens and the third lens along the first optical path.

24. The system of claim 15, further comprising a data source that dynamically supplies the first image generator with information sufficient to generate a dynamic display visible to the user.

25. The system of claim 24, wherein the data source is a portable media player.

26. The system of claim 15, further comprising:
    a second image generator that generates a second two-dimensional output image;
    a second mirror;
    a second lens;
    a second visor having a second visor reflective surface; and
    wherein during use the second image generator, second mirror, second lens, and second visor are fixed in relative positions so that the second output image passes through the second lens, reflects off the second mirror, passes through the second lens again, finally reflects off the reflective surface of the second visor and into a second eye of the user.

27. The system of claim 26, further comprising a frame that during use retains the first and second image generators, the first and second mirrors, and the first and second lenses and the first and second visors in their relative positions.

28. The system of claim 26, wherein at least one optical surface of the first lens and the second lens is cylindrical.

29. The system of claim 26, wherein the first lens and the second lens are meniscus lenses.

30. The system of claim 26, wherein the first visor and the second visor are the same lens of a pair of glasses.

31. The system of claim 26, wherein the first visor and the second visor are different lenses of the same pair of glasses.

32. The system of claim 26, further comprising:
    a third lens, wherein the first image generator, first mirror, first lens, third lens, and first visor are fixed in relative positions for reflecting the first output image into the first eye of the user during use;
    a first optical path wherein the first output image passes along the first optical path through the first lens, reflects off the first mirror, passes through the first lens again, passes through the third lens, and finally reflects off the reflective surface of the first visor into the first eye of the user during use;
    a first fold mirror located along the first optical path between the first image generator and the third lens;
    a fourth lens, wherein the second image generator, second mirror, second lens, fourth lens, are in positions relative to a second visor for reflecting the second output image into the second eye of the user during use;
    a second optical path wherein the second output image passes along the second optical path through the second lens, reflects off the second mirror, passes through the second lens again, passes through the fourth lens, and finally reflects off the reflective surface of the second visor into the second eye of the user during use; and
    a second fold mirror that is located along the second optical path between the second image generator and the fourth lens.

33. The system of claim 26, further comprising:
    a third lens;
    a fourth lens;
    a fifth lens; and
    a sixth lens;

wherein the first image generator, first mirror, first lens, third lens, fourth lens, and first visor are fixed in relative positions along a first optical path so that the first output image passes through the first lens, reflects off the first mirror, passes through the first lens again, passes through the third lens and the fourth lens, and finally reflects off the reflective surface of the first visor into a first eye of the user;

wherein the second image generator, second mirror, second lens, fifth lens, sixth lens and second visor are in relative positions along a second optical path so that the second output image passes through the second lens, reflects off the second mirror, passes through the second lens again, passes through the fifth lens and the sixth lens, and finally reflects off the reflective surface of the second visor into a second eye of the user; and wherein an intermediate image appears between the third lens and the fourth lens along the first optical path; and wherein an intermediate image appears between the fifth lens and the sixth lens along the second optical path.

34. The system of claim 1 wherein the first image generator, first mirror, first lens, and second lens are located between the ears of a user and forward of a user's face, the user's face not including the user's nose, when the user wears the system and the user including the user's head is in an upstanding position.

35. The system of claim 34 further comprising left and right ear stems, wherein the first image generator, first mirror, first lens, and second lens are contained within a volume located between the left and right ear stems, above the user's pupils and forward of a user's face, the user's face not including the user's nose, when the user wears the system and the user including the user's head is in an upstanding position.

36. The system of claim 35 further comprising a housing within the volume, the housing containing the first image generator, first mirror, first lens, and second lens.

37. The system of claim 36 wherein the housing, the first lens, the second lens, the visor and the first mirror comprise plastic material.

38. The system of claim 35 wherein the first image generator is selected from the group consisting of LCD-type and OLED-type image generators.

39. The system of claim 15 wherein the first image generator, first mirror, and first lens are located between the ears of a user and forward of a user's face, the user's face not including the user's nose, when the user wears the system and the user including the user's head is in an upstanding position.

40. The system of claim 15 further comprising left and right ear stems, wherein the first image generator, first mirror, first lens, and second lens are contained within a volume located between the left and right ear stems, above the user's pupils and forward of a user's face, the user's face not including the user's nose when the user wears the system and the user including the user's head is in an upstanding position.

41. The system of claim 39 further comprising a housing containing the first image generator, first mirror, and first lens.

42. The system of claim 41 wherein the first image generator is selected from the group consisting of LCD-type and OLED-type image generators.

43. The system of claim 9 wherein the reflective surface of the first visor is spherical, the first mirror is a spherical lens, the fifth lens is a cylindrical lens and the first mirror and fifth lens correct for astigmatism and distortion caused by the spherical reflective surface of the first visor.

44. The system of claim 15 wherein the reflective surface of the first visor is spherical, the first mirror is a spherical lens, the first lens is a cylindrical lens and the first mirror and first lens correct for astigmatism and distortion caused by the spherical reflective surface.

45. A heads-up display system for wearing and for viewing images when the system is worn by a user, the system comprising:

a first visor having a reflective surface; and a first optical assembly comprising a first image generator that generates a first two-dimensional output image, the first optical assembly for reflecting the first output image off the reflective surface of the first visor to a first pupil of the user as a focused and collimated first image, the first optical assembly contained within a volume such that when worn by a user the volume is located between the wearer's ears, above the user's pupils and forward of a user's face, the user's face not including the user's nose, when the user including the user's head is in an upstanding position.

46. The system of claim 45 wherein the first optical assembly further comprises a first mirror, first lens and a first optical path such that the first output image passes through the first lens, reflects off the first mirror, passes through the first lens again, and finally reflects off the reflective surface of the first visor and to the user's first pupil.

47. The system of claim 46 wherein the first reflective surface is spherical, the first mirror is spherical, the first lens is cylindrical, and the first mirror and first lens correct for astigmatism and distortion caused by the spherical first reflective surface.

48. The system of claim 45 wherein the first optical assembly further comprises a first mirror, a first lens, a second lens and a first optical path such that during use by a user of the system the first output image reflects off the first mirror, passes through the first lens and second lens, reflects off the reflective surface of the first visor and to the user's first pupil.

49. The system of claim 48 wherein an intermediate image appears between the first lens and the second lens.

50. The system of claim 45 wherein the optical assembly further comprises a first mirror, first lens, second lens, third lens and a first optical path such that during use by a user of the system the first output image passes through the first lens, reflects off the first mirror, passes through the first lens again, passes through the second lens and third lens and finally reflects off the reflective surface of the first visor and to the first pupil of the user.

51. The system of claim 50 wherein an intermediate image appears between the second lens and the third lens.

52. The system of claim 45 wherein the first image generator is selected from the group consisting of LCD-type and OLED-type image generators.

53. The system of claim 52 further comprising a data source that dynamically supplies the first image generator with information sufficient to generate a dynamic display of data to the user.

54. The system of claim 53 wherein the data source is a portable media player.

55. The system of claim 45 further comprising a second visor having a second visor reflective surface; and a second optical assembly comprising a second image generator that generates a second two-dimensional output image, the second optical assembly for reflecting the second output image off the reflective surface of the second visor onto a second pupil of the user as a focused and collimated second image, the second optical assembly located between the user's ears and above the user's pupils and forward of a user's face, the user's face not including the user's nose, when the user wears the system and the user including the user's head is in an upstanding position.

56. The system of claim 55, wherein the first visor and the second visor are parts of a pair of glasses.

57. A heads-up display system for viewing images when the system is worn by a user, the system comprising:
a first image generator that generates a first output image;
a first mirror;
a first visor having a reflective surface; and
a first lens and a second lens,
wherein the first image generator, first mirror, first lens, second lens, and first visor are fixed in relative positions so that
the first output image reflects off the first mirror, passes through the first lens and second lens, and reflects off the reflective surface of the first visor into a first eye of the user;
a second image generator that generates a second output image;
a third lens and a fourth lens;
a second mirror; and
a second visor having a reflective surface;
wherein the second image generator, third lens, fourth lens, second mirror, and second visor are fixed in relative positions so that the second output image reflects off the second mirror, passes through the third lens, passes through the fourth lens, and reflects off the reflective surface of the second visor into a second eye of the user; and
wherein an intermediate image appears between the third lens and the fourth lens,
wherein the first mirror and the second mirror are each selected from the mirror type class consisting of:
a toroidal mirror,
an aspheric mirror,
a hyperbolic mirror,
an elliptical mirror,
a parabolic mirror, and
a spherical mirror;
a fifth lens and a sixth lens;
wherein the fifth lens is fixed in a position relative to the first mirror so that the first output image passes through the fifth lens both before and after the first output image reflects off the first mirror; and
wherein the sixth lens is fixed in a position relative to the second mirror so that the second output image passes through the sixth lens both before and after the second output image reflects off the second mirror;
an intermediate image appears between the first lens and the second lens.

58. A heads-up display system for viewing images when the system is worn by a user, the system comprising:
a first image generator that generates a first output image;
a first mirror;
a first visor having a reflective surface; and
a first lens and a second lens,
wherein the first image generator, first mirror, first lens, second lens, and first visor are fixed in relative positions so that
the first output image reflects off the first mirror, passes through the first lens and second lens, and reflects off the reflective surface of the first visor into a first eye of the user;
a second image generator that generates a second output image;
a third lens and a fourth lens;
a second mirror; and
a second visor having a reflective surface;
wherein the second image generator, third lens, fourth lens, second mirror, and second visor are fixed in relative positions so that the second output image reflects off the second mirror, passes through the third lens, passes through the fourth lens, and reflects off the reflective surface of the second visor into a second eye of the user; and
wherein an intermediate image appears between the third lens and the fourth lens,
a fifth lens and a sixth lens, each of which being a meniscus lens;
wherein the fifth lens is fixed in a position relative to the first mirror so that the first output image passes through the fifth lens both before and after the first output image reflects off the first mirror; and
wherein the sixth lens is fixed in a position relative to the second mirror so that the second output image passes through the sixth lens both before and after the second output image reflects off the second mirror.

59. A heads-up display system for viewing images when the system is worn by a user, the system comprising:
a first image generator that generates a first output image;
a first mirror;
a first visor having a reflective surface; and
a first lens and a second lens,
wherein the first image generator, first mirror, first lens, second lens, and first visor are fixed in relative positions so that
the first output image reflects off the first mirror, passes through the first lens and second lens, and reflects off the reflective surface of the first visor into a first eye of the user;
a second image generator that generates a second output image;
a third lens and a fourth lens;
a second mirror; and
a second visor having a reflective surface;
wherein the second image generator, third lens, fourth lens, second mirror, and second visor are fixed in relative positions so that the second output image reflects off the second mirror, passes through the third lens, passes through the fourth lens, and reflects off the reflective surface of the second visor into a second eye of the user; and
wherein an intermediate image appears between the third lens and the fourth lens,
a data source that dynamically supplies the first image generator and the second image generator with information sufficient for each to generate a dynamic display visible to the user;
a fifth lens and a sixth lens;
wherein the fifth lens is fixed in a position relative to the first mirror so that the first output image passes through the fifth lens both before and after the first output image reflects off the first mirror; and
wherein the sixth lens is fixed in a position relative to the second mirror so that the second output image passes through the sixth lens both before and after the second output image reflects off the second mirror.

60. The system of claim 59, wherein the data source is a portable media player.

61. A heads-up display system for viewing images when worn by a user, the system comprising:
a first image generator that generates a first output image;
a first mirror;

a first visor having a reflective surface; and
a first lens and a second lens,
wherein the first image generator, first mirror, first lens, second lens, and first visor are fixed in relative positions so that
the first output image reflects off the first mirror, passes through the first lens and second lens, and reflects off the reflective surface of the first visor into a first eye of the user;
a second image generator that generates a second output image;
a third lens and a fourth lens;
a second mirror; and
a second visor having a reflective surface;
wherein the second image generator, third lens, fourth lens, second mirror, and second visor are fixed in relative positions so that the second output image reflects off the second mirror, passes through the third lens, passes through the fourth lens, and reflects off the reflective surface of the second visor into a second eye of the user; and
wherein an intermediate image appears between the third lens and the fourth lens,
a frame that fixes the first image generator, second image generator, first mirror, second mirror, first lens, second lens, third lens, fourth lens, first visor and second visor in their relative positions;
a fifth lens and a sixth lens;
wherein the fifth lens is fixed in a position relative to the first mirror so that the first output image passes through the fifth lens both before and after the first output image reflects off the first mirror; and
wherein the sixth lens is fixed in a position relative to the second mirror so that the second output image passes through the sixth lens both before and after the second output image reflects off the second mirror.

62. A heads-up display system for viewing images when worn by a user, the system comprising:
a first image generator that generates a first output image;
a first mirror;
a first lens;
a first visor having a reflective surface; and
wherein the first image generator, first mirror, first lens, and first visor are fixed in relative positions along a first optical path so that the first output image passes through the first lens, reflects off the first mirror, passes through the first lens again, and finally reflects off the reflective surface of the first visor into a first eye of the user; and
wherein at least one optical surface of the first lens is cylindrical.

63. A heads-up display system for viewing images when worn by a user, the system comprising:
a first image generator that generates a first output image;
a first mirror;
a first lens;
a first visor having a reflective surface; and
wherein the first image generator, first mirror, first lens, and first visor are fixed in relative positions along a first optical path so that the first output image passes through the first lens, reflects off the first mirror, passes through the first lens again, and finally reflects off the reflective surface of the first visor into a first eye of the user; and
wherein the first lens is a meniscus lens.

64. A heads-up display system for viewing images when worn by a user, the system comprising:
a first image generator that generates a first output image;
a first mirror;
a first lens;
a first visor having a reflective surface; and
wherein the first image generator, first mirror, first lens, and first visor are fixed in relative positions along a first optical path so that the first output image passes through the first lens, reflects off the first mirror, passes through the first lens again, and finally reflects off the reflective surface of the first visor into a first eye of the user; and
a second image generator that generates a second output image;
a second mirror;
a second lens;
a second visor having a reflective surface;
wherein the second image generator, second mirror, second lens, and second visor are fixed in relative positions along a second optical path so that the second output image passes through the second lens, reflects off the second mirror, passes through the second lens again, and finally reflects off the reflective surface of the second visor into a second eye of the user; and
wherein at least one optical surface of the first lens and the second lens is cylindrical.

65. The system of claim 64, wherein the first lens and the second lens are meniscus lenses.

66. The system of claim 26 wherein the reflective surface of the first visor is spherical, the first mirror is spherical, at least one optical surface of the first lens is cylindrical and the first mirror and first lens correct for astigmatism and distortion caused by the spherical reflective surface; and
wherein the reflective surface of the second visor is spherical, the second mirror is spherical, at least one optical surface of the second lens is cylindrical and the first mirror and second lens correct for astigmatism and distortion caused by the spherical reflective surface.

* * * * *